United States Patent [19]

Amino et al.

[11] Patent Number: 5,070,049

[45] Date of Patent: Dec. 3, 1991

[54] STARTING COMPOSITION FOR THE PRODUCTION OF SILICON CARBIDE AND METHOD OF PRODUCING THE SAME

[75] Inventors: Toshikazu Amino; Satoshi Takenaka, both of Gifu, Japan

[73] Assignee: Ibiden, Co. Ltd., Gifu, Japan

[21] Appl. No.: 286,264

[22] Filed: Dec. 19, 1988

[30]  Foreign Application Priority Data

Dec. 26, 1987 [JP] Japan .................................. 62-331572
Jun. 27, 1988 [JP] Japan .................................. 63-158359

[51] Int. Cl.$^5$ ............................................... C04B 35/56
[52] U.S. Cl. ........................................ 501/88; 501/90; 501/53; 264/65; 423/345
[58] Field of Search .................... 501/88, 89; 423/345; 264/65

[56]  References Cited

U.S. PATENT DOCUMENTS 4,529,575 7/1985 Enomoto et al. .................... 423/345
4,839,150 6/1989 Coyle et al. ......................... 423/345

FOREIGN PATENT DOCUMENTS 1186447  2/1965 Fed. Rep. of Germany .
58-194731 11/1983 Japan .
59-39709  3/1984 Japan .
59-141411 8/1984 Japan .
59-190208 10/1984 Japan .
60-36377  2/1985 Japan ..................................... 501/88

Primary Examiner—William R. Dixon, Jr.
Assistant Examiner—Alan Wright
Attorney, Agent, or Firm—Sandler, Greenblum, & Bernstein

[57]  ABSTRACT

In the production of silicon carbide, a starting composition comprising silicon dioxide powder and a carbonaceous substance and having a bulk density of 0.2 to 2.0 g/cm$^3$ is used, wherein the silicon dioxide is covered with the carbonaceous substance and uniformly dispersed therein. The starting composition is produced by forming a kneaded mixture of silicon dioxide and high molecular weight organic compound, heating the kneaded mixture to conduct carbonization and thereby form a composite body and then granulating the composite body into 3 to 25 mm sized granules.

10 Claims, 2 Drawing Sheets

STARTING COMPOSITION FOR THE PRODUCTION OF SILICON CARBIDE AND METHOD OF PRODUCING THE SAME

BACKGROUND OF THE INVENTION

1. Field of the Invention

This invention relates to a starting composition for the production of silicon carbide and a method of producing the same, and more particularly to a starting composition usable for the production of silicon carbide through a carbon reduction process. Further, it relates to a starting composition applicable for the production of very fine powder of silicon carbide and a method of producing the same.

2. Related Art Statement

Heretofore, the following methods have been known for the production of silicon carbide:

(1) method of carbonizing metal silicon powder with carbon powder or a hydrocarbon gas;

(2) method of reduction carbonization of silicon oxide powder with carbon powder or a hydrocarbon gas;

(3) method of reacting a halogenated silicon and a hydrocarbon gas at vapor phase;

(4) method of precipitating silicon carbide from an organosilicon high molecular weight compound;

(5) method of reacting silicon dioxide and carbon at a molten state; and (6) method of electrolyzing a molten salt.

Among them, the inventors have particularly examined the methods (1)–(4) and confirmed the following. That is, in the methods (3) and (4), a very fine powder of silicon carbide can be produced, but the starting materials used are very expensive. In the method (1), it is difficult to obtain very fine silicon powder, as an industrial method. On the contrary, the method (2) is considered to be effective because relatively cheap starting materials can be used. In fact, the inventors have made studies with respect to the production of fine powder of silicon carbide based on the method (2) and have proposed various techniques using the same, such as in Published Japanese Patent Application No. 58-194,731, No. 59-39,709, No. 59-141,411 and No. 59-190,208.

All of the foregoing techniques are concerned with a method of using very fine carbon powder as a starting material and are to provide pellets of starting composition for the production of silicon carbide, wherein the carbon particle is uniformly arranged around the silicon dioxide powder for obtaining fine silicon carbide powder. Since the very fine carbon powder generally has an agglomerating property, however, it is difficult to uniformly disperse this powder, so that in the above techniques, it is very difficult to obtain pellets of the starting composition for the production of silicon carbide in which the carbon powder is uniformly dispersed around the silicon dioxide particles.

SUMMARY OF THE INVENTION

It is, therefore, an object of the present invention to develop a starting composition in which the silicon dioxide particles are dispersed in a matrix comprising uniformly dispersed carbon powder, which has never been achieved in the techniques previously proposed by the inventors, and a method capable of producing such a starting material. That is, the invention is to provide a starting composition for the production of very fine silicon carbide powder and a method of producing the same.

According to a first aspect of the invention, there is provided a starting composition for the production of silicon carbide, comprising granulates consisting of silicon dioxide powder and a carbonaceous substance in which said silicon dioxide particles are uniformly dispersed in said carbonaceous substance while covering at least a part of said silicon dioxide particles surface with said carbonaceous substance, and wherein the granulates have a bulk density of 0.2–2.0 g/cm$^3$.

According to a second aspect of the invention, there is provided a method of producing a starting composition for the production of silicon carbide, which comprises the steps of:

(a) mixing silicon dioxide powder with a high molecular weight organic compound to form a kneaded mixture;

(b) heating the kneaded mixture to perform a carbonization reaction of said high molecular weight organic compound to thereby form a porous carbonaceous substance, and at the same time uniformly dispersing said silicon dioxide into a matrix formed by said carbonaceous substance to form a composite body; and (c) granulating said composite body into granules.

DESCRIPTION OF THE PREFERRED EMBODIMENTS

Figure 1:
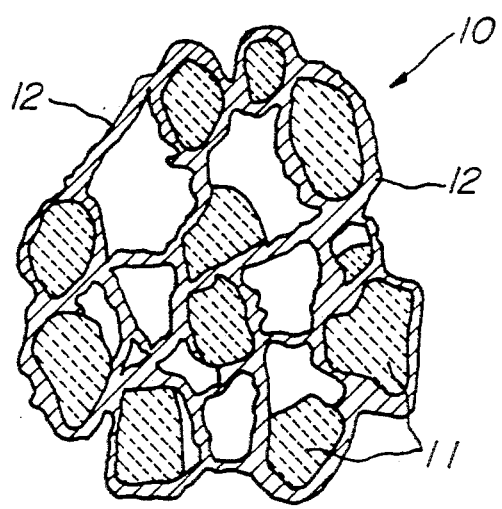
FIG. 1 is a diagrammatic enlarged sectional view of the starting composition for the production of silicon carbide according to the invention at a granular state.

The starting composition for the production of silicon carbide according to the invention comprise granules of silicon dioxide powder and a carbonaceous substance, wherein at least a part of the surface of the silicon dioxide particles are covered with the carbonaceous substance. When the starting composition has the above granular form, the reaction to form SiC can proceed very rapidly and hence the silicon dioxide particles can completely be reacted. Since the reaction to form SiC is a primary solid-solid reaction of $SiO_2 + C \rightarrow SiO$, the surface of silicon dioxide particles are covered with the carbonaceous substance, so that the above solid-solid reaction is caused. However, if at least a part of the surface is covered with the carbonaceous substance, as the solid-solid reaction proceeds, $SiO_2$ and C are consumed by the reaction and hence $SiO_2$ and C partially come into contact with each other.

Further, the starting composition has a bulk density of 0.2–2.0 g/cm$^3$. When the bulk density is less than 0.2 g/cm$^3$, the compression strength of the granule is too low and is not suitable for use. That is, when the starting composition is used in to a synthesis method, such as of the fluidized bed type, full charged moving bed type, fixed bed type or the like for the production of silicon carbide, it is necessary to consider the gas escaping or heat transfer (thermal conduction) by rendering the composition into granules. In this case, the granule is required to have a certain strength. Further, the reaction vessel is necessary to have a large volume.

On the other hand, when the bulk density exceeds 2.0 g/cm$^3$, the reactivity becomes low and it is difficult to produce very fine silicon carbide powder which is an object of this invention.

The reason why the average particle size of silicon dioxide powder is limited to 0.01–100 μm is due to the fact that when the average particle exceeds 100 μm, the specific surface area of silicon dioxide powder becomes considerably small and consequently the thickness of the matrix wall of the carbonaceous substance covering the surface of silicon dioxide powder must be very thick. When this occurs, the reaction efficiency lowers and the resulting carbide is apt to be coarsed. In contrast when it is less than 0.01 μm, the silicon dioxide powder is hardly available, and if available, it is expensive and unsuitable for use as an industrial material. The average particle size is preferably within a range of 0.1–80 μm.

It is necessary that the carbonaceous substance have a volatile matter content of not more than 20%. When the volatile matter exceeds 20%, if silicon carbide is synthesized by the moving bed type method, fusing and adhesion occurs between its granules due to the volatilization during heating and smooth descending of particles through gravity is obstructed.

The carbonaceous substance forming the matrix is produced by subjecting a high molecular weight organic compound to carbonization. In this case, it is advantageous to use the high molecular weight organic compound having a volatile matter content of 20–90%. When the volatile matter is less than 20%, it is difficult to uniformly disperse the silicon dioxide into the high molecular weight organic compound. When it exceeds 90%, the matrix is broken due to the generation of large amounts of volatilized gas during the carbonization reaction or the unhomogeneous composition having a large pore size is formed when the gas escapes. And also, the formation of effective components become less, so that it is unfavorable in view of the cost.

In other words, the volatile matter of the high molecular weight organic compound is controlled to hold the proper fluidity and gas amount, whereby the homogeneous mixed composition can be obtained. Therefore, the volatile matter is preferable within a range of 20–40%.

The high molecular weight organic compound may be selected from substances showing a liquid state during the mixing and/or heating step. For example, they may be selected from the group consisting of liquid substances at room temperature such as crude oil, residual oil, phenol resin, tar pitch and the like; solvent soluble substances such as polyvinyl acetate (solvent: toluene), phenol resin (solvent: alcohol or benzene), saccharides (solvent: water) and the like; and heat soluble substances such as medium soft pitch, hard pitch asphalt and the like. Among them, heat soluble substance can advantageously be used to have a uniform reaction proceed.

The starting composition for the production of silicon carbide according to the invention is produced by the three steps as previously mentioned; that is (a) mixing silicon dioxide powder with a high molecular weight organic compound to form a kneaded mixture;

(b) heating the kneaded mixture to conduct the carbonization reaction of said high molecular weight organic compound to thereby form a porous carbonaceous substance, and at the same time uniformly dispersing said silicon dioxide into a matrix formed by said carbonaceous substance to form a composite body; and (c) granulating said composite body to form granules having a grain size of 1–15 mm.

In the step (a), amount of high molecular weight organic compound to silicon dioxide mixed is suitable to be an amount of carbon corresponding to 67–170% of theoretical amount required for carbonizing silicon dioxide (i.e. C/SiO$_2$ mol ratio=2.5–5.1). When the amount of the high molecular weight organic compound is less than 67%, the resulting silicon carbide is apt to be again reduced to metallic silicon. Further, the generated intermediate gas product escapes unreacted without effectively reacting with the carbonaceous substance, resulting in the decrease of production efficiency.

Concretely, the amount precipitated at semi-melt state increases according to the following reaction formula:

$$SiO + CO \rightarrow SiO_2 + C$$

whereby the smooth separation of the starting material through gravity is obstructed in the continuously moving bed type synthesis, and also the intermediate gas product escapes away from the reaction system at the unreacted state.

On the other hand, when the amount of the high molecular weight organic compound is more than 170% of the theoretical amount required for the carbonization of silicon dioxide, carbon not contributing to the carbonization reaction is heated to higher temperature, so that the heat efficiency lowers and also the quality of the product is degraded and the cost required in the starting material undesirably increases. Consequently the silicon carbide can not be produced economically.

The invention will be described in detail with respect to the above steps in order.

In the production of the starting composition according to the invention, it is first necessary that the high molecular weight organic compound and silicon dioxide are mixed and uniformly dispersed in liquid state after the mixing.

The mixing is preferable carried out in a kneader suitable for handling wet powder among ordinary mixers. Particularly, twin-arm type kneader (cutting line type, superimposing type), continuous type cokneader or compounder, international mixer and the like can be used. Among them, when using a heat soluble substance, the twin-arm, superimposing and jacket type kneader is preferable in view of the heating step.

According to the invention, the mixing temperature ($T_A$, °C.) in the heat soluble substance is preferable to satisfy the following relation to the softening temperature of the high molecular weight organic compound ($T_1$, °C.):

$$T_1 \leq T_A \leq (T_1 + 300)$$

When the heat-kneading temperature is lower than the softening temperature $T_1$, the high molecular weight organic compound is not rendered into liquid form, so that silicon dioxide powder can not be dispersed uniformly. While, when it higher than $(T_1+300)$, the carbonization of the high molecular weight organic compound starts and the silicon dioxide powder can not uniformly be dispersed.

Moreover, even when the temperature $T_A$ is near to the softening temperature, if the viscosity of the high molecular weight organic compound is high, the mixing takes a long time and also the mixing load becomes high, so that it is more preferable to satisfy the following relation:

$$(T_1+50) \leq T_A \leq (T_1+200)$$

Then, the intimate mixture is carbonized by heating at a temperature higher than the softening temperature to form a matrix, and silicon dioxide is uniformly dispersed therein to form a composite body. In this case, the carbonization is preferable to be carried out at air atmosphere, because when the carbonization is carried out in a non-oxidizing atmosphere, gasification is caused without crosslinking to reduce the carbonization yield, and heat quantity required for decomposition becomes larger due to the fact that combustion heat through oxidation can not be added, while when the atmosphere is an excessively oxidizing atmosphere, carbon is oxidized.

The carbonization is carried out at a temperature ($T_B$, °C.) of not lower than 600° C. If the temperature is lower than 600° C., the carbonization reaction does not proceed or a long time is required for the carbonization. However, when it is too high, the oxidation becomes violent at the contact portion with air to burn out carbon and consequently the compounding ratio and dispersion become nonuniform.

In order to use the composite body as a starting composition for the production of silicon carbide, it is necessary to render the composite body into granules having an average grain size of 1-15 mm. Because of the gas escaping during the synthesis reaction and the smooth separation of the material by gravity, fluidizability and the like are required in the starting composition for producing silicon carbide powder through devices like the fluidized layer-type, moving layer-type or fixed bed-type reactors.

The reason why the average grain size is limited to 1-15 mm is due to the fact that when it is less than 1 mm, fusing between granules is caused during the synthesis reaction to degrade the gas escaping and consequently the equilibrium of the reaction is obstructed and the continuous and smooth separation by gravity of product is hindered.

Preferably, the average grain size is not more than 5 mm in case of the fluidized layer-type, 5-15 mm in case of the moving layer-type, and not less than 10 mm in case of the fixed bed-type.

However, when the high molecular weight organic compound, in the fluidized state as mentioned above, is used and carbonized to form the composite body, the resulting composite body becomes generally big and lumpy except when the composite body is previously formed into a desired shape (for example, granules of 1-15 mm) in a shaping mold.

When using the above shaping mold, the grinding step mentioned below is not necessarily required, but when considering the productivity and cost, it is preferable to grind the lumpy composite body into granules.

As a means for grinding the big lumpy composite body into granules having the average grain size of 1-15 mm, use may be made of a crusher, hammer mill and the like. The lumpy composite body is rough-ground and middle-ground by such a grinding machine. If necessary, the grain size is adjusted by using a sieve.

In this case, the ground average grain size is advantageous to be 0.5-5 mm as far as possible.

The reason why the ground average grain size is limited to 0.5-5 mm is due to the fact that when the grain size is adjusted only by the above grinding and sieving without granulation, the granules obtained are not spherical but are relatively angular, which adversely affects the smooth separation by gravity of the starting composition capable of being separated from reaction gas generated in the synthesis. That is, the ground grains having the average grain size of 0.5-5 mm are preferable to be used as a starting seed to be granulated (hereinafter referred to as granulation seed) which are granulated into a grain size of 1-15 mm by the subsequent granulation means.

When the ground average grain size is less than 0.5 mm, a long time is required for obtaining granules having an average grain size of 1-15 mm according to the invention and the granulation is very difficult. While, when it exceeds 5 mm, granules having a grain size larger than desired are formed.

As the granulation means, the same mixture of silicon dioxide powder and high molecular weight organic compound as in the above step (a) is continuously fed to the granulation seed with stirring, which are burnt through gas in air atmosphere to carbonize the mixture, whereby granules having an average grain size of 1-15 mm are created.

That is, according to the invention, it is preferable that granules having an average grain size of 1-15 mm are formed by using the granulation seed to prevent the mutual fusing of the mixture.

As the means for the above carbonization granulation, it is preferable to use a heating vessel provided with a screw type stirrer in which pins are vertically attached on a horizontal shaft. The temperature in the heating vessel is the same as in the carbonization at procedure step (b).

The continuously feeding rate of the mixture to the heating vessel is 0.001 kg/kg.min-0.04 kg/kg.min of the high molecular weight organic compound intimate mixture with 1 kg of the granulation seed, and the peripheral speed of the pin is advantageously within a range of 0.2-5 m/min.

When the feeding rate of the high molecular weight organic compound is less than 0.001 kg/kg.min, the oxidation rate on the surface of the granule in the oxidizing atmosphere is faster than the carbonizing rate of the high molecular weight organic compound and the granulation can not be conducted. On the other hand, when it is more than 0.04 kg/kg.min, the carbonizing rate of the high molecular weight organic compound is not consistent to the feeding rate and the high molecular compound weight organic compound is not carbonized on the granule causing the seed to adhere to the wall of the heating vessel and obstruct the rotation of the pin. Further, the reason why the peripheral speed of the pin is limited to 0.2-5 m/min is due to the fact that when it is less than 0.2 m/min, the high molecular weight organic compound causes the fusing between mutual granules, while when it is more than 5 m/min, the granules are broken by the pin.

Figure 2:
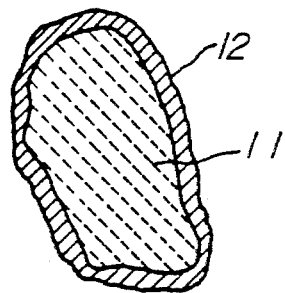
FIG. 2 is a diagrammatic enlarged sectional view of single starting composition for the production of silicon carbide according to the invention.
Figure 3:
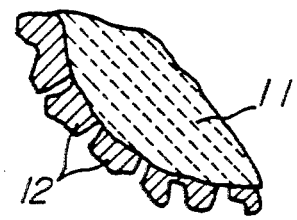
FIG. 3 is a partially enlarged view of FIG. 2.

In the starting composition for the production of silicon carbide according to the invention, silicon dioxide is uniformly dispersed in the matrix as shown in FIGS. 1 to 3. That is, silicon dioxide having an average particle size of 0.01–100 μm is uniformly dispersed into the carbonaceous substance forming the matrix. Therefore, when the starting composition for the production of silicon carbide according to the invention is synthesized for producing silicon carbide, the reaction is carried out according to the following reaction formulae:

$SiO_2 + C \rightarrow SiO \uparrow + CO \uparrow$

$SiO + 2C \rightarrow SiC + CO \uparrow$

In addition, SiO gas generated in the course of the production of silicon carbide from the starting material reacts with carbon in the carbonaceous substance located therearound to form silicon carbide.

Further, SiO gas as an important intermediate material in the production of silicon carbide is important to be effectively contacted with carbon as a starting material for maintaining the yield and purity of silicon carbide, which is sufficiently ensured owing to the presence of the coating of carbonaceous substance forming the matrix around the silicon dioxide as shown in FIG. 1. This shows that the complete reaction is carried out as far as possible and fine silicon carbide can be produced.

The following examples are given in the illustration of the invention and are not intended as limitations thereof.

EXAMPLE 1

Silica sand ($SiO_2 = 97$ wt %, average grain size: not more than 5 μm, specific gravity: 2.6) was uniformly mixed with residual oil (fixed carbon: 12.1 wt %) at a mixing ratio by weight of 14.4:85.6, which was kneaded in an oil bath at 100° C. for 30 minutes to obtain a kneaded mixture uniformly dispersing silica sand into residual oil.

Then, the kneaded mixture was placed in a flat bottom vessel and heated in an oxidizing atmosphere at 800° C. for 15 minutes to carbonize the residual oil, whereby a porous starting composition is formed for the production of silicon carbide having $SiO_2 : F.C. : V.M = 1 : 0.68 : 0.13$ in which the silica sand was covered with a film of the carbonaceous substance form.

This composition was pulverized by means of a jaw crusher and then sieved through a sieve having openings of 5 mm and 15 mm to obtain a granular composition of 3–15 mm as shown in the following Table 1.

That is, this granular composition had an average grain size of 7–8 mm, a bulk density of 0.5 g/cm³, VM of 7.2 wt %, $SiO_2$ content of 55 wt %, carbonaceous substance content of 38 wt % and a $C/SiO_2$ mol ratio of 3.4.

Then, the granular composition was used to prepare SiC as follows. At first, this composition was charged into a vertical type furnace (having a preheating zone) a heating zone and a cooling zone from the top at a descending rate of 2.0 m/hr and continuously heated at a controlling temperature of 2000° C. The heating element used in this furnace was made from graphite and had the following sizes:

length of heating zone: 1.2 m
length of reaction cylinder: 3.6 m
length of preheating zone: 1.0 m
length of cooling zone: 1.4 m
inner diameter of heating and cooling zone: 0.3 m
inner diameter of preheating zone: 0.5 m The resulting product (SiC) taken out from the water-cooling type rotary valve was a fine SiC containing article having a specific surface area of 10 m²/g, maximum diameter of 5.5 μm, unreacted $SiO_2$ content of 0.6 wt % and F.C. (free carbon) of 9.3 wt %.

EXAMPLE 2

Silica sand ($SiO_2 = 98$ wt %, average grain size: 5 μm, specific gravity: 2.6) was uniformly mixed with hard pitch (Kurodai NK-300, trade name, made by Osaka Kasei K.K., fixed carbon: 50.5 wt %, average grain size: 0.4 mm, softening point: 120°–130° C.) at a mixing ratio by weight of 47:53, which was kneaded in a kneader provided with a twin-arm type blade at 250° C. for 30 minutes while liquefying the hard pitch to obtain a kneaded mixture uniformly dispersing the silica sand into the hard pitch.

Then, the kneaded mixture was placed in a flat bottom vessel and heated in an oxidizing atmosphere at 750° C. for 30 minutes to carbonize the pitch, whereby a lumpy starting composition formed for the production of silicon carbide in which the silica sand was covered with a film of the carbonaceous substance.

This composition was pulverized by means of a jaw crusher and then sieved through a sieve having openings of 5 mm and 3 mm to obtain granular composition for seed of 3–5 mm.

About 10 kg of the granular composition for seed was charged into a stirring and heating vessel having a structure as shown in FIG. 5 and heated to 800° C. by means of an external heater, to which was charged another kneaded mixture at a feeding rate of 200 g/min while rotating the blade at 13 rpm, during which the pitch included in the mixture was carbonized to further conduct the granulation. In this case, the above weight as the seed corresponded to about a half the volume of the vessel.

Figure 5A:
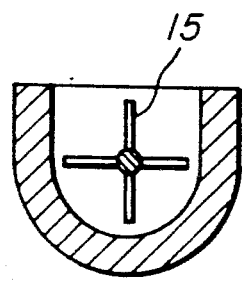
FIG. 5a is a sectional side elevation view of a vessel for stirring and heating used in Example 2.
Figure 5B:
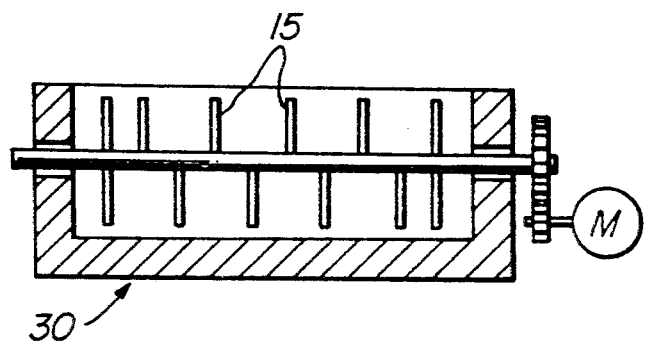
FIG. 5b is a sectional front elevation view of a vessel for stirring and heating used in Example 2.

The stirring and heating vessel as shown in FIG. 5a and 5b was a semicircular vessel 30 having a cylindrical inner diameter of 248 mm, a height of 248 mm and a length of 520 mm and provided with 10 pin-like blades 15 of 110 mm in length arranged at equal intervals therein. Into this vessel was continuously charged the given amount of the kneaded mixture for 250 minutes.

The thus obtained granules 10 had a bulk density of 0.7 g/cm³, carbonaceous substance content of 39 wt %, silicon dioxide content of 59 wt %, a volatile matter of 2 wt % and a structure as shown in FIGS. 1–3 wherein silica sand 11 was coated with the film of carbonaceous substance 12. Further, they were substantially spherical and exhibited good fluidity. The weight of the granules obtained was 41 kg. Then, the granules were sieved to obtain 30 kg of granules having a grain size of 5–10 mm. Moreover, the weight of the sieved granules having a grain size of 3–5 mm was 10 kg, which was again charged into the stirring and heating vessel. The remaining granules of about 1 kg were mixed with the pitch for reuse. This procedure was repeated to obtain about 500 kg of granules having a grain size of 5–10 mm.

Then, the thus obtained granules were charged as a starting composition for the production of SiC into a vertical type furnace from the top thereof at a descending rate of 2.0 m/hr and continuously heated at a controlling temperature of 2030° C.

The thus obtained product was fine silicon carbide containing product having a specific surface area of 11.2 $m^2/g$, maximum diameter of 5 $\mu m$, a content of unreacted silicon dioxide of 1.7 wt % and free carbon content of 1.0 wt %.

EXAMPLE 3

100 parts by weight of silica powder ($SiO_2$: 99.5%, average grain size: 31 $\mu m$) and 210 parts by weight of a solution obtained by mixing 100 parts by weight of toluene-soluble solid novolac type phenolic resin (fixed carbon: 43 wt %) with 50 parts by weight of toluene under stirring were kneaded in a kneader at room temperature for 30 minutes in the same manner as in Example 2.

The kneaded mixture was poured into a concave mold (semisphere $\phi$: 12 mm) and burnt through gas in an oxidation furnace at 900° C. for 2 minutes to conduct carbonization. The thus obtained carbonized material was cooled and taken out from the furnace to obtain the granular composition as shown in Table 1.

The granular composition was filled in a graphite crucible having an inner diameter of 100 mm and a depth of 100 mm, which was placed in a Tanman furnace having a heating zone size $\phi$ of 150 mm and a height of 200 mm and purged with Ar gas. Then, it was raised at a temperature rising rate of 600° C./hr and held at 1800° C. for 1 hour. Thereafter, the resulting product was cooled and taken out from the furnace. This product had a composition as shown in Table 1.

EXAMPLE 4

100 parts by weight of the same silica sand as in Example 1 and 370 parts by weight of anhydrous coal tar (made by Osaka Gas K.K., specific gravity: 1.19, Engler degree: 10.8, fixed carbon: 18 wt %) were mixed at 30° C. with a stirrer. Then, a part of the resulting mixture was burnt through gas in air in the same manner as in Example 1 to conduct carbonization. Thereafter, the carbonized material was pulverized to not more than 1 mm by means of jaw crusher and disc grinder to the obtain granular carbonized composition as shown in Table 1.

The granular composition was filled in a graphite reaction cylinder having an inner diameter $\phi$ of 70 mm provided with a distributor plate having an opening ratio of 1 wt % and a pore size of 0.5 mm, which was attached to the inside of the same Tanman furnace as in Example 3, to a bed height of 50 mm. After the purging with Ar gas, the temperature was raised at 600° C./hr, and Ar gas was flown at 8 Nl/mm from 1000° C. through the distributor plate to form a fluidized bed, which was held at 1700° C. for 0.5 hour and then cooled. The thus obtained product had properties as shown in Table 1.

EXAMPLE 5

The same carbonized granular composition having a grain size of not more than 1 mm was filled in a vertical type tubular stainless steel reaction tube having an inner diameter of 100 mm and heated to 500° C. Thereafter, $N_2$ was blown at 20 Nl/min from the bottom center of the tube through a tube of 10 mm in inner diameter to form a spouted bed, to which was fed the remaining mixture of Example 4 (500 cc/min) from a middle height portion of the tube to grow the granules in the inside of the tube until fluidization did not occur. The thus obtained granular composition had properties as shown in Table 1.

The granular composition was reacted in a vertical type furnace having an inner diameter of reaction cyclinder of 50 mm and a heating zone length of 300 mm by descending downward at 1900° C. and a descending rate of 1.5 m/hr to obtain a synthesized product as shown in Table 1.

COMPARATIVE EXAMPLE 1

Carbon black (fixed carbon: 98.6 wt %, specific surface area: 40 $m^2/g$) and hard pitch powder (fixed carbon: 50.5 wt %) were added to the same silica sand as in Example 2 in an amount corresponding to 120 wt % of the theoretical compounding amount required for the formation of silicon carbide. In this case, the amount of hard pitch powder was 7.0 wt % by weight to the silica sand. Then, the resulting mixture was uniformly mixed by means of a high speed stirring mixer (trade name: Henshell mixer), to which was added an aqueous carboxy methyl-cellulose solution. The resulting mixture was shaped by means of a pan pelletizer to obtain a starting composition having an average grain size of 4.6 mm.

Figure 4:
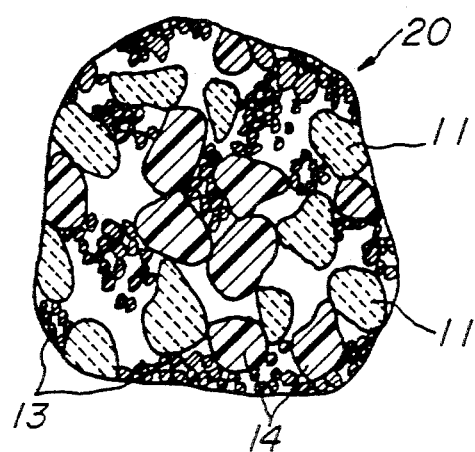
FIG. 4 is a diagrammatic enlarged view of the conventional starting composition used in the production of silicon carbide using a conventional technique.

In the resulting composition, silicon dioxide powder, pitch and carbon black were present as aggregates without forming a matrix as shown in FIG. 4.

This starting composition was heated and reacted in the vertical type furnace in the same manner as in Example 1. The resulting product had a specific surface area of 3.7 $m^2/g$, a maximum grain size of 25 $\mu m$, a content of unreacted $SiO_2$ of 5.1 wt % and a content of free carbon of 5.5 wt %.

TABLE 1a

| | | Example 1 | Example 2 |
|---|---|---|---|
| Silicon dioxide | purity | 97 wt. % | 98 wt % |
| | average grain size | 5 $\mu m$ under | 5 $\mu m$ |
| | specific gravity | 2.6 | 2.6 |
| Organic high molecular compound | kind | residual oil | hard pitch (solid) |
| | fixed carbon | 12.1 wt % | 50.5 wt % |
| | softenic point | — | 120~130° C. |
| | average grain size | — | 0.4 m |
| | treating means before use | non-treated | heating |
| Mixing condition | temperature, time | (as viscosity adjustment) 100° C. × 30 min. | 250° C. × 30 min. |
| | atmosphere | stirring in oil bath | mixing kneader in air |
| Carbonization | temperature, time | 800° C. × 15 min. | 750° C. × 30 min. |
| | atmosphere | oxidizing | oxidizing |
| | others | | |
| Pulverization | means | jaw crusher | jaw crusher |
| Sieving | sieve | 5.15 mm | 3 mm, 5 mm |
| Granulation | means | — | 800° C. mixing heating |
| Furnace | | vertical type furnace descending rate 2.0 m/hr 2000° C. | vertical type furnace descending rate 2.0 m/hr 2030° C. |
| Granular composition | average grain size | 7~8 mm | 9 mm |
| | bulk density | 0.5 g/cm$^3$ | 0.7 g/cm$^3$ |
| | volatile matter | 7.2 wt % | 2 wt % |
| | silicon dioxide | 55 wt % | (0.983 mol) 59 wt % |
| | carbonaceous | 38 wt % | (3.25 mol) |

TABLE 1a-continued

|  |  | Example 1 | Example 2 |
|---|---|---|---|
|  | substance |  | 39 wt % |
|  | mol ratio | 3.4 | 3.3 (110 wt %) |
| Product | specific surface area | 10 m²/g | 11.2 m²/g |
|  | maximum grain size | 5.5 μm | 5 μm |
|  | unreacted SiO₂ | 0.6 wt % | 1.7 wt % |
|  | free carbon | 9.3 wt % | 1.0 wt % |

TABLE 1b

|  |  | Example 3 | Example 4 |
|---|---|---|---|
| Silicon dioxide | purity | 99.5 wt. % | 97 wt % |
|  | average grain size | 31 μm | 5 μm |
|  | specific gravity | 2.6 | 2.6 |
| Organic high molecular compound | kind | phenolics (solid) | anhydrous coal tar |
|  | fixed carbon | 43 wt % | 18 wt % |
|  | softenic point | 120~130° C. | — |
|  | average grain size | 1 mm | — |
|  | treating means before use | toluene: phenol resin = 1:2 | non-treated |
| Mixing condition | temperature, time | (stirring over a day) 20° C. × 30 min. | 30° C. × 15 min. |
|  | atmosphere | mixing in kneader in nitrogen | mixing in kneader in air |
| Carbonization | temperature, time | 900° C. × 15 min. | 800° C. × 30 min. |
|  | atmosphere | air | air |
|  | others | hemisphere (12 mmφ) | oxidizing |
| Pulverization | means | none | jaw crusher and disk grinder |
| Sieving | sieve | 12 mm | 1 mm |
| Granulation | means | — | — |
| Furnace |  | tanman type batch furnace (graphite crucible) 600° C./hr temperature rising rate 1700° C. 1 hr | tanman furnace batch (fluidizing crucible) 600° C./hr temperature rising rate 0.5 hr |
| Granular composition | average grain size | 10 mm | 0.4 mm |
|  | bulk density | 0.5 g/cm³ | 0.6 g/cm³ |
|  | volatile matter | 1.5 wt % | 3.5 wt % |
|  | silicon dioxide | 63.7 wt % (1.06 mol) | 58 wt % (0.967 mol) |
|  | carbonaceous substance | 34.8 wt % (2.9 mol) | 38.5 wt % (3.208 mol) |
|  | mol ratio | 2.74 (91.2 wt %) | 3.3 (110 wt %) |
| Product | specific surface area | 9.2 m²/g | 12.1 m²/g |
|  | maximum grain size | 7 μm | 5 μm |
|  | unreacted SiO₂ | 0.3 wt % | 2.1 wt % |
|  | free carbon | 1.1 wt % | 11.2 wt % |

TABLE 1c

|  |  | Example 5 | Comparative Example |
|---|---|---|---|
| Silicon dioxide | purity | 97 wt. % | 98 wt % |
|  | average grain size | 5 μm | 5 μm |
|  | specific gravity | 2.6 | 2.6 |
| Organic high molecular compound | kind | anhydrous coal tar | carbon black (40 m²/g, fixed carbon 98.6 wt %) + hard pitch powder |
|  | fixed carbon | 18 wt % | — |
|  | softenic point | — | — |
|  | average grain size | — | — |
|  | treating means before use | non-treated | (<44 μm fixed carbon 50.5 wt %) in henshell mixer for 3 minutes |
| Mixing condition | temperature, time atmosphere | 30° C. × 15 min. mixing in kneader in air | |
| Carbonization | temperature, time atmosphere others | 800° C. × 30 min. air oxidizing | |
| Pulverization | means | jaw crusher and disk grinder | |
| Sieving | sieve | 1 mm | |
| Granulation | means | 500° C. N₂ gas granulating | pan-pelletizing granulator to 3~10 mm air 130° C. × 5 hr |
| Furnace |  | vertical type furnace descending rate 1.5 m/hr 1900° C. | vertical type furnace descending rate 1.8 m/hr 2010° C. |
| Granular composition | average grain size | 7 mm | 4.6 mm |
|  | bulk density | 0.3 g/cm³ | 1.1 g/cm³ |
|  | volatile matter | 5.3 wt % | 4.2 wt % |
|  | silicon dioxide | 59 wt % | 56 wt % |
|  | carbonaceous substance | 35.7 wt % | 39.8 wt % |
|  | mol ratio | 3.03 | 3.55 |
| Product | specific surface area | 8.7 m²/g | 3.7 m²/g |
|  | maximum grain size | 7 μm | 2.5 μm |
|  | unreacted SiO₂ | 0.2 wt % | 5.1 wt % |
|  | free carbon | 0.9 wt % | 5.5 wt % |

As mentioned above, according to the invention, there is provided a granular starting composition for the production of silicon carbide in which silicon dioxide powder having an average grain size of 0.1-100 μm is uniformly dispersed into a matrix composed of a carbonaceous substance having a volatile matter of not more than 10 wt % and obtained by carbonization of a high molecular weight organic compound. Such a starting composition is shaped into granules having an average grain size of 3-15 mm, from which fine and homogeneous silicon carbide powder can be produced.

What is claimed is:

1. A method of producing a starting composition for the production of silicon carbide powder, which comprises the steps of:
   (a) mixing silicon dioxide powder with an amount of high molecular weight organic compound corresponding to 67 to 170% of the theoretical compounding amount required for carbonizing a given amount of SiO₂ in step (b) to form a kneaded mixture;
   (b) heating the kneaded mixture by burning in an oxidizing air atmosphere to conduct a carbonization reaction of said high molecular weight organic compound to thereby form a porous carbonaceous substance, and at the same time uniformly dispersing said silicon dioxide into a matrix formed by said carbonaceous substance, to form a composite body; and
   (c) granulating said composite body into granules having a grain size of 1 to 15 mm.

2. The method according to claim 1, wherein said silicon dioxide powder used in said step (a) has an average grain size of 0.01 to 100 μm.

3. The method according to claim 1, wherein said high molecular weight organic compound used in said step (a) is liquid and forms a carbonaceous substance having a volatile matter content of no more than 20 wt % upon heating.

4. The method according to claim 1, wherein said kneaded mixture in said step (a) is obtained by mixing a silicon dioxide powder with high molecular weight organic compound which is at room temperature.

5. The method according to claim 1, wherein said kneaded mixture in said step (a) is obtained by mixing said high molecular weight organic compound under heat rendering it into a liquid.

6. The method according to claim 1, wherein said kneaded mixture in said step (a) is obtained by mixing said high molecular weight organic compound dissolved in a solvent.

7. The method according to claim 1, wherein when said granules obtained in said step (c) have an average grain size of 1 to 5 mm, they are further mixed with said kneaded mixture obtained at said step (a) and carbonized to form granules having an average grain size of 1 to 15 mm.

8. The method according to claim 1, wherein said mixing at said step (a) is carried out at a temperature satisfying the following relation:

$$T_1 \leq T_A \leq T_1 + 300$$

wherein $T_1$ is a heating temperature (° C.) in the kneading and $T_A$ is a softening temperature (° C.) of said high molecular weight organic compound.

9. The method according to claim 1, wherein said carbonization reaction in said step (b) is carried out at a temperature of not lower than 600° C.

10. A method of producing a starting composition for the production of silicon carbide powder, which comprises the steps of:
(a) mixing silicon dioxide powder having an average grain size of 0.01 to 100 μm with a high molecular weight organic compound capable of carbonizing to form a porous carbonaceous substance to form a kneaded mixture;
(b) heating the kneaded mixture in an oxidizing atmosphere to conduct a carbonization reaction of said high molecular weight organic compound to thereby form a porous carbonaceous substance, and at the same time uniformly dispersing said silicon dioxide into a matrix formed by said carbonaceous substance, to form a composite body; and
(c) granulating said composite body into granules having a grain size of 1 to 15 mm.

* * * * *